(12) United States Patent
Xu (10) Patent No.: US 8,958,074 B1
(45) Date of Patent: Feb. 17, 2015

(54) LOW STRAIN OPTICAL FIBER COIL AND ASSOCIATED FIBER OPTIC GYROSCOPE AND METHOD

(75) Inventor: Yuanjian Xu, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 222 days.

(21) Appl. No.: 13/595,611

(22) Filed: Aug. 27, 2012

(51) Int. Cl.
*G01C 19/72* (2006.01)

(52) U.S. Cl.
USPC .......................................................... 356/465

(58) Field of Classification Search
CPC ............... G01C 19/64–19/728; G02B 6/4457; G01P 3/363
USPC .................... 356/465, 460; 385/12, 13, 14, 32
See application file for complete search history.

(56) References Cited

U.S. PATENT DOCUMENTS

| | | | | |
|---|---|---|---|---|
| 4,120,588 | A * | 10/1978 | Chaum .......................... | 356/460 |
| 4,699,451 | A * | 10/1987 | Mohr ............................ | 356/465 |
| 4,793,708 | A | 12/1988 | Bednarz | |
| 5,229,831 | A * | 7/1993 | Carroll et al. .................. | 356/461 |
| 5,781,301 | A * | 7/1998 | Ruffin ........................... | 356/465 |
| 5,946,439 | A | 8/1999 | Terasawa et al. | |
| 6,215,933 | B1 * | 4/2001 | Rahn .............................. | 385/123 |
| 6,587,205 | B2 * | 7/2003 | Goldner et al. ............... | 356/465 |
| 6,885,456 | B2 * | 4/2005 | Hashimoto .................... | 356/465 |
| 7,450,808 | B2 | 11/2008 | Seifert | |
| 7,477,806 | B2 * | 1/2009 | Williams ........................ | 385/12 |
| 8,340,482 | B2 * | 12/2012 | Arashitani et al. ............. | 385/32 |
| 2002/0015154 | A1 * | 2/2002 | Goldner et al. ............... | 356/465 |
| 2003/0053067 | A1 * | 3/2003 | Hashimoto .................... | 356/460 |
| 2008/0101753 | A1 * | 5/2008 | Suzuki et al. .................. | 385/114 |
| 2008/0130010 | A1 * | 6/2008 | Williams ........................ | 356/465 |
| 2008/0317426 | A1 | 12/2008 | Shukunami et al. | |
| 2009/0045894 | A1 * | 2/2009 | Aubert ........................... | 335/216 |
| 2009/0065959 | A1 | 3/2009 | Seifert | |
| 2010/0170076 | A1 * | 7/2010 | Suzuki et al. .................. | 29/458 |
| 2010/0247055 | A1 * | 9/2010 | Arashitani et al. ............ | 385/137 |

OTHER PUBLICATIONS

Darley, "Enhancement and Development of an Automated Fiber Optic Gyroscope Coil Winding Machine," Master of Science Thesis at MIT (1995).

* cited by examiner

*Primary Examiner* — Kara E Geisel
*Assistant Examiner* — Violeta A Prieto
(74) *Attorney, Agent, or Firm* — Walters & Wasylyna LLC (57) ABSTRACT

An optical fiber coil including an optical fiber having a first end and a second end, the optical fiber including first, second, third and fourth segments, wherein the first segment is contiguous with the second segment, the second segment is contiguous with the third segment, and the third segment is contiguous with the fourth segment, and plural substantially planar layers stacked along a coil axis, the layers including a first planer layer formed from the first segment, a second planar layer formed from the second segment, a third planar layer formed from the third segment, and a fourth planar layer formed from the fourth segment, wherein the fourth planar layer is positioned between the first planar layer and the second planar layer, and wherein the second planer layer is positioned between the third planer layer and the fourth planar layer.

16 Claims, 8 Drawing Sheets

LOW STRAIN OPTICAL FIBER COIL AND ASSOCIATED FIBER OPTIC GYROSCOPE AND METHOD

FIELD

This application relates to fiber optics and, more particularly, to optical fiber coils and, even more particularly, to optical fiber coils for use in rotation sensing applications, such as fiber optic gyroscopes.

BACKGROUND

Fiber optic gyroscopes are known to be very sensitive to rotation. Therefore, fiber optic gyroscopes are used as an alternative to (or in addition to) mechanical gyroscopes to collect rotational rate data.

Figure 1:
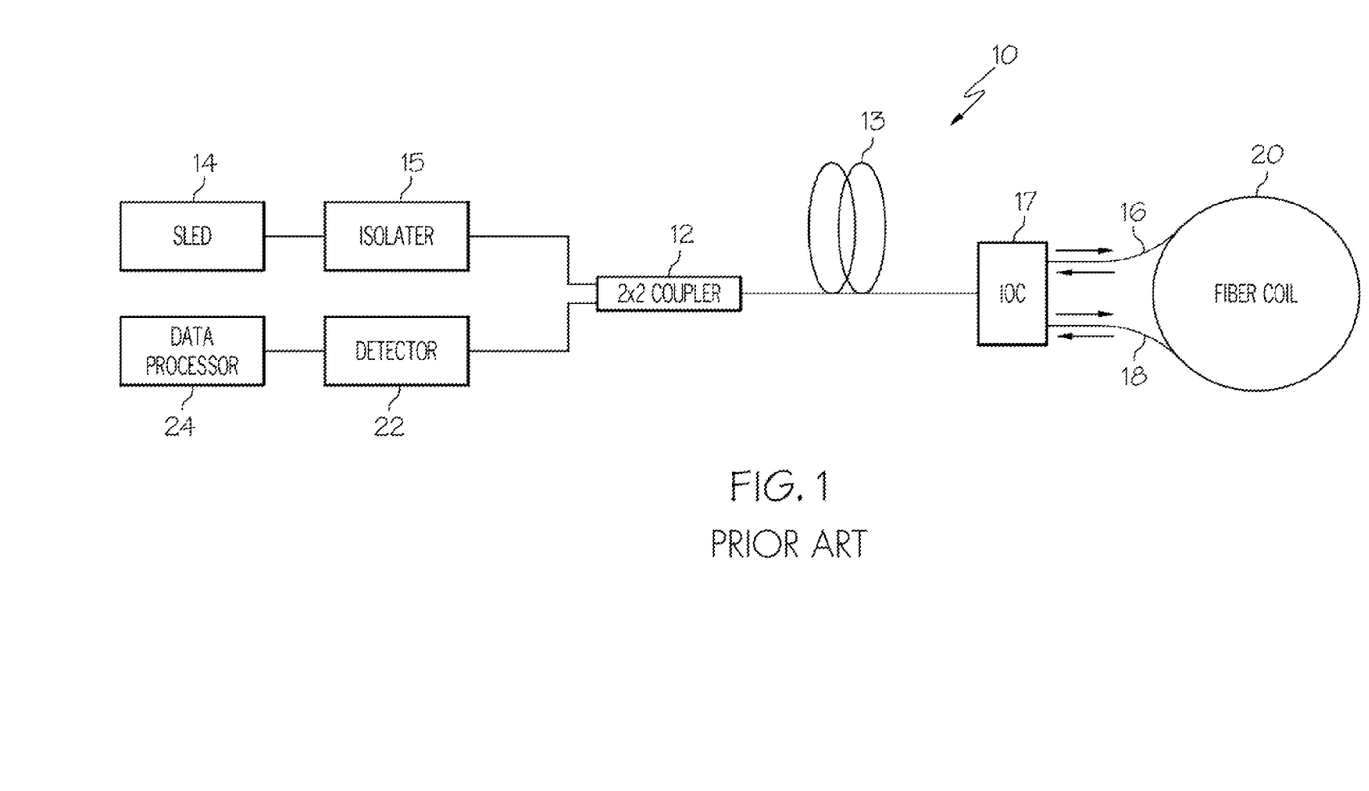
FIG. 1 is a block diagram of a prior art fiber optic gyroscope.

Referring to FIG. 1, a typical fiber optic gyroscope 10 includes a beam splitter 12 (e.g., a 2×2 coupler) that splits the light from a light source 14 (e.g., a superluminescent diode) into two beams, and directs the two light beams into the two opposed ends 16, 18 of an optical fiber coil 20. Therefore, two light waves propagate in opposite directions through the optical fiber coil 20. An isolator 15 may be interposed between the light source 14 and the beam splitter 12, and a depolarizer 13 may be interposed between the beam splitter 12 and the fiber coil 20. An integrated optical circuit 17 may modulate the light at a certain frequency such that the processing of the detected signal by the detector 22 is easier and more sensitive.

Pursuant to the Sagnac effect, rotation of the optical fiber coil 20 establishes a phase shift between the two light waves. Therefore, the fiber optic gyroscope 10 includes a detector 22 to measure the phase shift. A data processor 24 may correlate the measured phase shift to a rate of rotation (e.g., angular velocity) of the optical fiber coil 20.

In addition to rotation, various environmental factors may affect the measured phase shift and, as such, may compromise the accuracy of the rotational rate measurements taken by fiber optic gyroscope. These environmental factors include, for example, the temperature gradient across the optical fiber coil, local stress within the optical fiber coil, vibration and magnetic fields.

Thus, various attempts have been made to minimize the effects of environmental factors on fiber optic gyroscopes. Nonetheless, despite advances already made, those skilled in the art continue with research and development efforts in the field of fiber optics and rotation sensing.

SUMMARY

In one embodiment, the disclosed optical fiber coil may include an optical fiber having a first end and a second end, wherein the optical fiber is wound into multiple planar layers, and wherein the planar layers are stacked along a coil axis.

In another embodiment, the disclosed fiber optic gyroscope may include (1) an optical fiber coil including an optical fiber having a first end and a second end, wherein the optical fiber is wound into a plurality of substantially planar layers, and wherein the substantially planar layers are stacked along a coil axis, (2) a light source configured to provide a first light beam to the first end and a second light beam to the second end, and (3) a detector configured to receive the first light beam from the second end and the second light beam from the first end.

In yet another embodiment, the disclosed method for manufacturing an optical fiber coil may include the steps of (1) providing a length of optical fiber, (2) winding a first segment of the optical fiber into a first planar layer, and (3) winding a second segment of the optical fiber into a second planar layer.

Other embodiments of the disclosed low strain optical fiber coil and method for manufacturing the same will become apparent from the following detailed description, the accompanying drawings and the appended claims.

DETAILED DESCRIPTION

Figure 2:
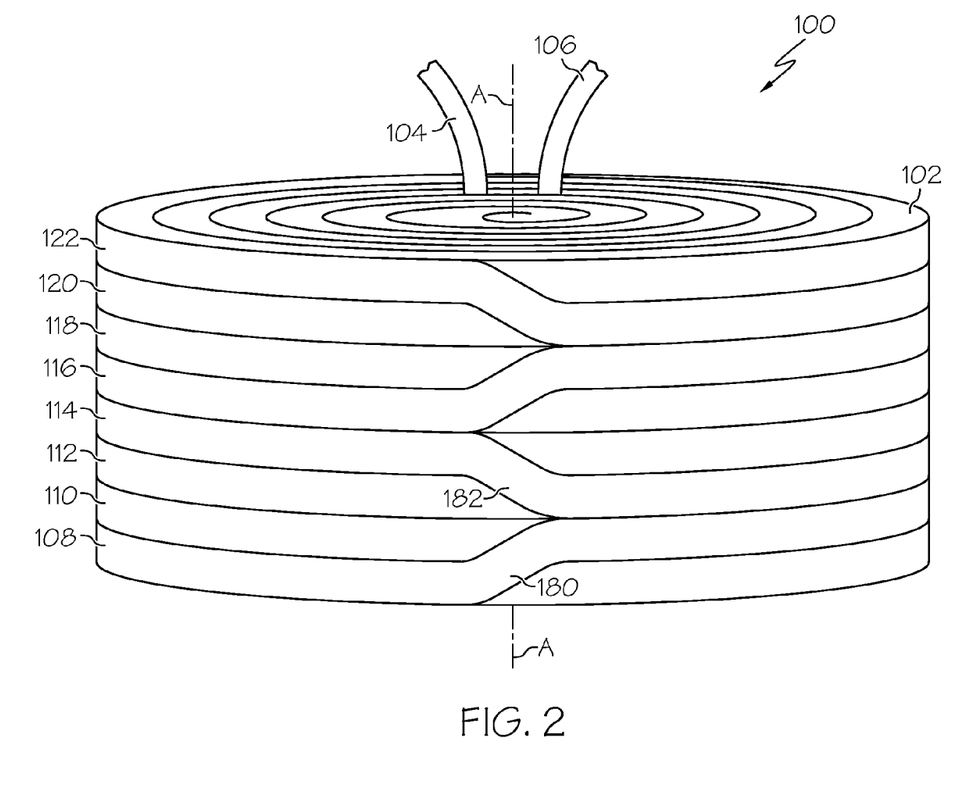
FIG. 2 is a front perspective view of one embodiment of the disclosed low strain optical fiber coil.

Referring to FIG. 2, one embodiment of the disclosed low strain optical fiber coil, generally designated 100, may include a continuous optical fiber 102 having a first end 104 and a second end 106. The optical fiber 102 may be formed into a plurality of layers 108, 110, 112, 114, 116, 118, 120, 122, and the layers 108, 110, 112, 114, 116, 118, 120, 122 may be stacked along a coil axis A.

The optical fiber 102 may be any elongated waveguide structure through which light beams may pass. For example, the optical fiber 102 may be constructed from glass, polymeric materials or combinations thereof. Those skilled in the art will appreciate that the length of optical fiber 102 (i.e., the distance from the first end 104 to the second end 106 along the optical fiber 102) may be dictated by the intended application (e.g., fiber optic gyroscope) of the optical fiber coil 100. For example, the optical fiber 102 may have a length of at least 100 meters, such as 1 kilometer or 5 kilometers.

Figure 3:
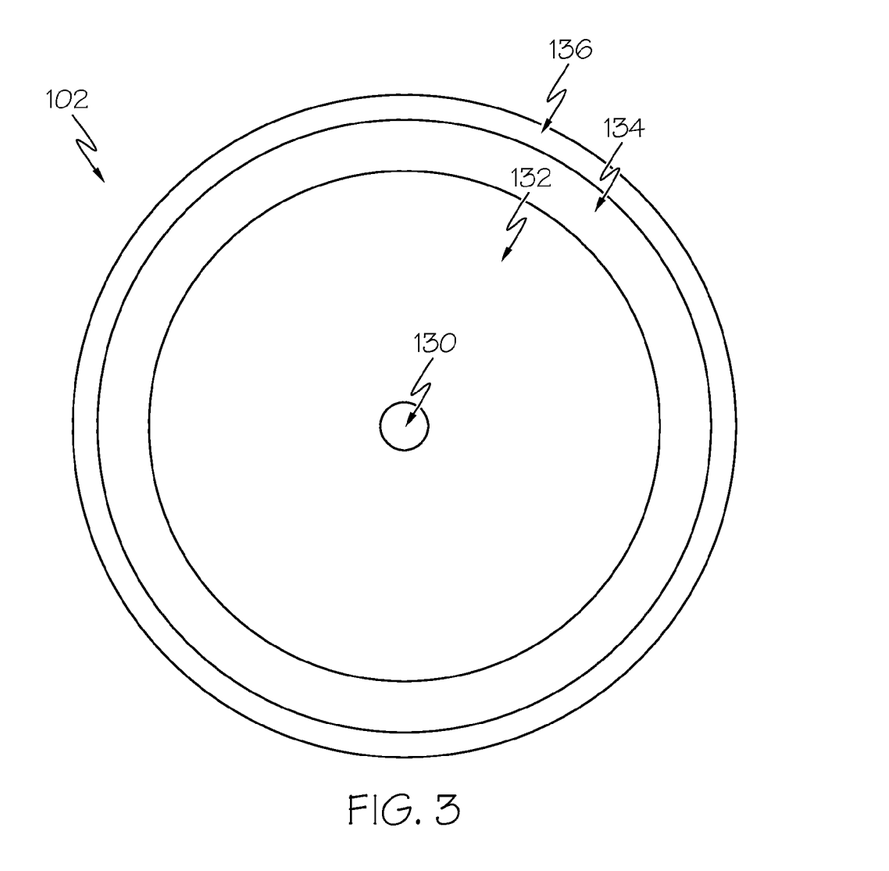
FIG. 3 is a cross-sectional view of the optical fiber of the low strain optical fiber coil of FIG. 2.

Referring to FIG. 3, the optical fiber 102 may include a core 130 and a cladding layer 132 positioned over the core 130. The cladding layer 132 may have a different (e.g., lower) index of refraction than the core 130 such that light is guided by the fiber structure. The cladding layer 132 may be covered with a thin coating 134, such as a urethane acrylate polymer.

Optionally, a bonding layer 136, such as a layer of thermoplastic polymer, may be applied over the fiber outer coating layer 134. Therefore, after the optical fiber coil 100 (FIG. 2) is formed, the bonding layer 136 may facilitate bonding the optical fiber 102 to itself, thereby preserving the overall structure of the optical fiber coil 100.

Figure 4:
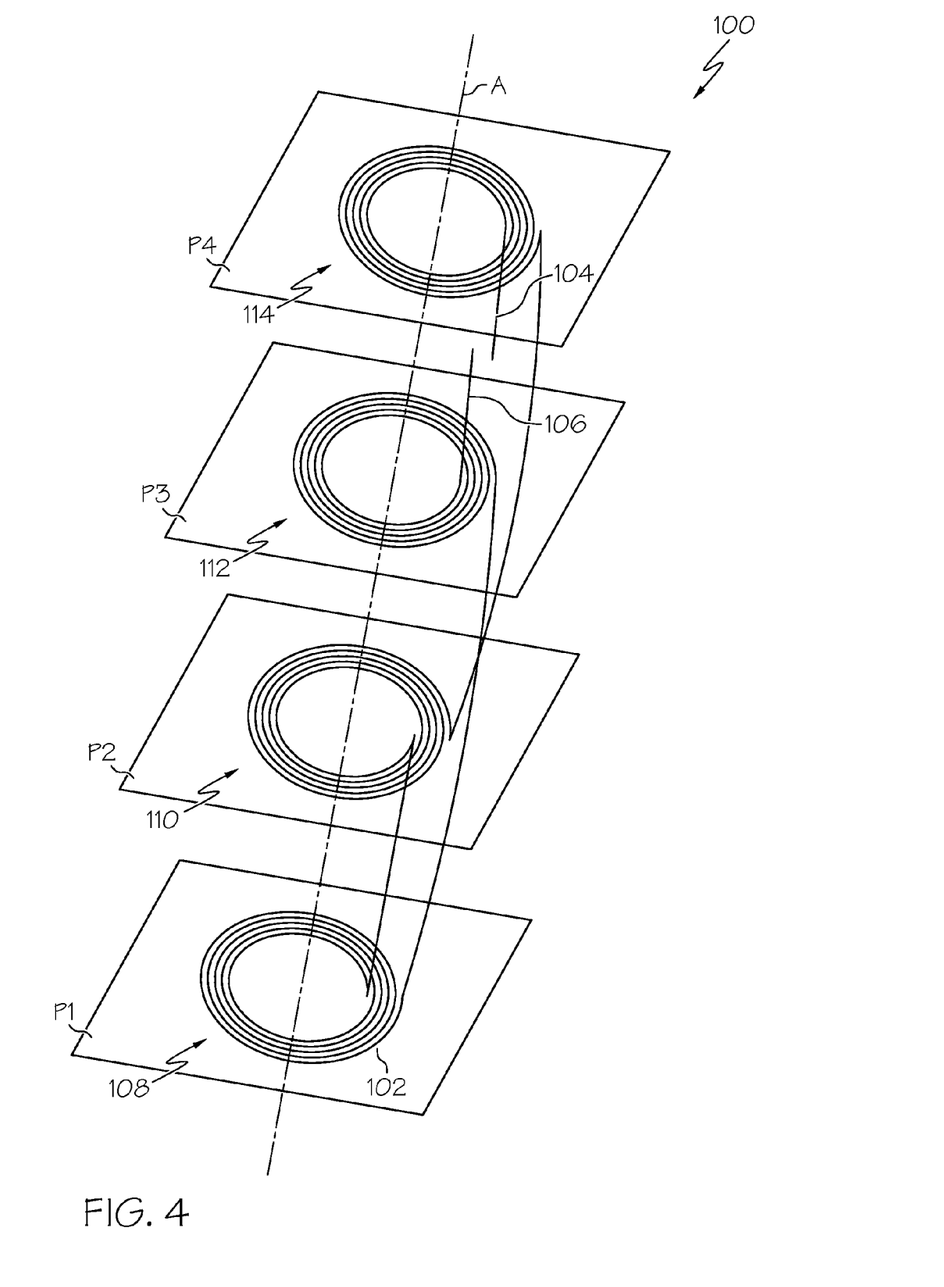
FIG. 4 is an exploded perspective view of a portion of the low strain optical fiber coil of FIG. 2.

Referring to FIG. 4, each layer (only layers 108, 110, 112, 114 are shown in FIG. 4) of the optical fiber coil 100 may be formed by winding the optical fiber 102 in a plane. In one winding technique, the optical fiber 102 may be wound from the center of the optical fiber 102 (i.e., from a point substantially centered between the first end 104 and the second end 106 of the optical fiber 102). In another winding technique, the optical fiber 102 may be wound from one of the ends 104, 106 (e.g., the first end 104 or the second end 106) of the optical fiber 102. Other winding techniques are also contemplated.

The first layer 108 of the optical fiber coil 100 may lie substantially in a first plane $P_1$, the second layer 110 may lie substantially in a second plane $P_2$, the third layer 112 may lie substantially in a third plane $P_3$, and the fourth layer 114 may lie substantially in a fourth plane $P_4$. The planes $P_1$, $P_2$, $P_3$, $P_4$ may be generally parallel, and may be transverse (e.g., perpendicular) to the coil axis A.

At this point, those skilled in the art will appreciate that the number of layers in the optical fiber coil 100 may depend on various factors, including the desired length of the optical fiber 102, the size (e.g., the diameter) of the optical fiber 102, the flexibility of the optical fiber 102, and the size constraints of the optical fiber coil 100.

Figure 5A:
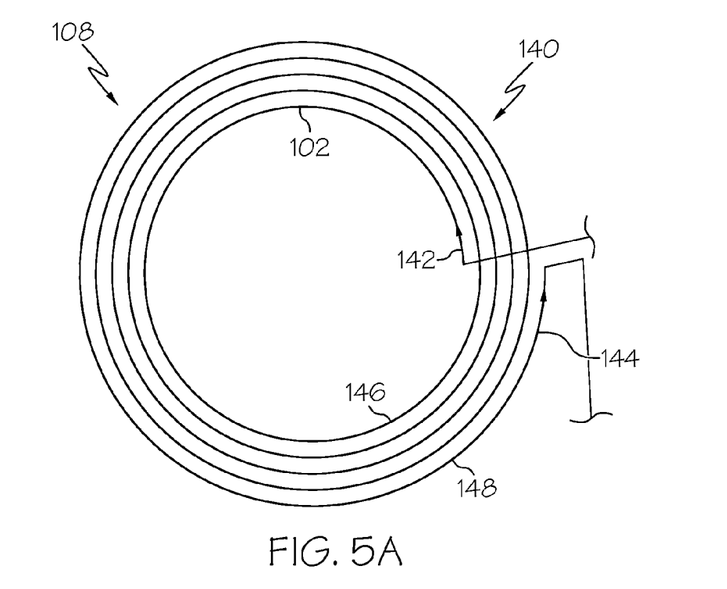
FIGS. 5A-5D are top planar views of individual layers of the low strain optical fiber coil of FIG. 3.

As shown in FIG. 5A, the first layer 108 of the optical fiber coil 100 may be formed by winding a first segment 140 of the optical fiber 102 in the first plane $P_1$ (FIG. 4). The first segment 140 may include a first end 142 and a second end 144, and may have a length sufficient to provide the desired spacing (radial width) between the inner edge 146 and the outer edge 148 of the first layer 108. The first end 142 of the first segment 140 may be held in place proximate the inner edge 146, and the optical fiber 102 may be wound in the first plane $P_1$ in a counter-clockwise direction (or, alternatively, a clockwise direction) about the coil axis A until the outer edge 148 is formed.

Figure 5B:
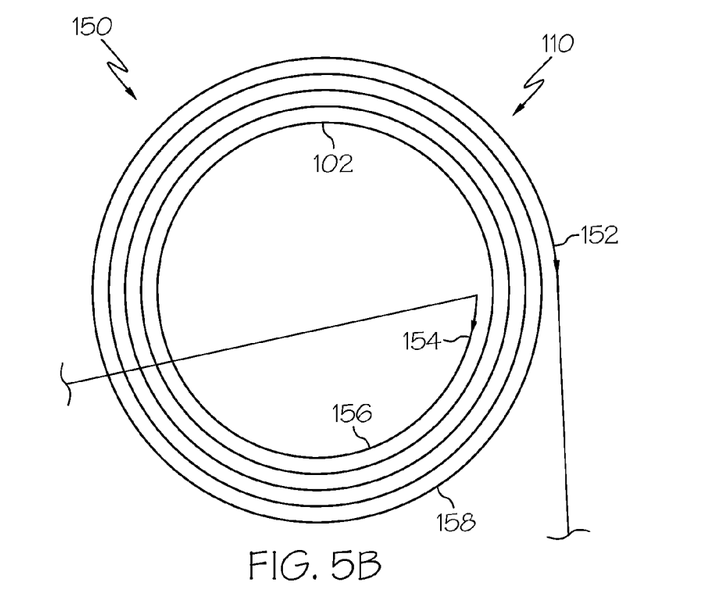

As shown in FIG. 5B, the second layer 110 of the optical fiber coil 100 may be formed by winding a second segment 150 of the optical fiber 102 in the second plane $P_2$ (FIG. 4). The second segment 150 may include a first end 152 and a second end 154, and may have a length sufficient to provide the desired spacing (radial width) between the inner edge 156 and the outer edge 158 of the second layer 110. The first end 152 of the second segment 150 may be held in place proximate the outer edge 158, and the optical fiber 102 may be wound in the second plane $P_2$ in a clockwise direction (or, alternatively, a counter-clockwise direction) about the coil axis A until the inner edge 156 is formed.

Figure 5C:
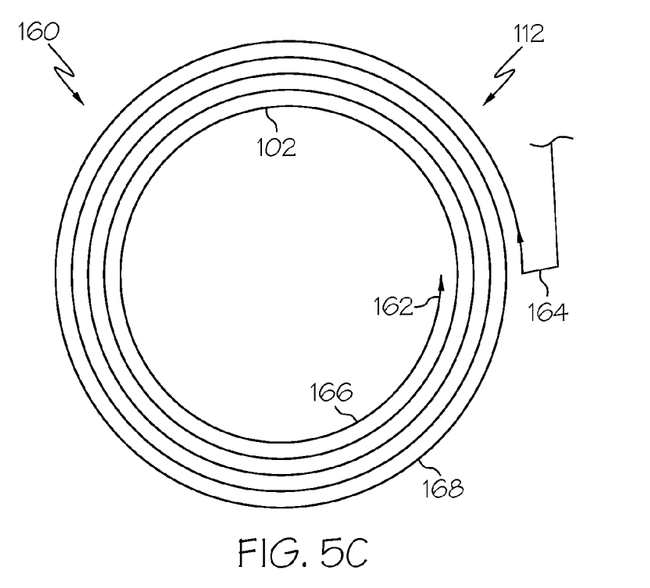

As shown in FIG. 5C, the third layer 112 of the optical fiber coil 100 may be formed by winding a third segment 160 of the optical fiber 102 in the third plane $P_3$ (FIG. 4). The third segment 160 may include a first end 162 and a second end 164, and may have a length sufficient to provide the desired spacing (radial width) between the inner edge 166 and the outer edge 168 of the third layer 112. The first end 162 of the third segment 160 may be held in place proximate the inner edge 166, and the optical fiber 102 may be wound in the third plane $P_3$ in a counter-clockwise direction (or, alternatively, a clockwise direction) about the coil axis A until the outer edge 168 is formed.

Figure 5D:
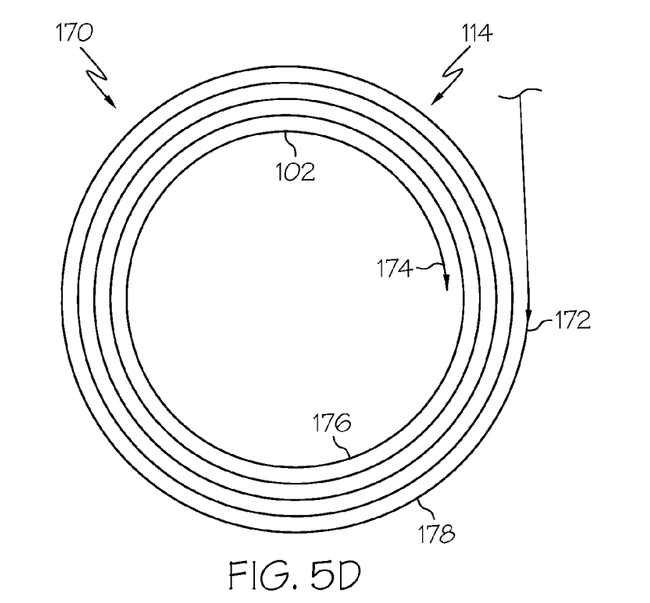

As shown in FIG. 5D, the fourth layer 114 of the optical fiber coil 100 may be formed by winding a fourth segment 170 of the optical fiber 102 in the fourth plane $P_4$ (FIG. 4). The fourth segment 170 may include a first end 172 and a second end 174, and may have a length sufficient to provide the desired spacing (radial width) between the inner edge 176 and the outer edge 178 of the fourth layer 114. The first end 172 of the fourth segment 170 may be held in place proximate the outer edge 178, and the optical fiber 102 may be wound in the fourth plane $P_4$ in a clockwise direction (or, alternatively, a counter-clockwise direction) about the coil axis A until the inner edge 176 is formed.

Still referring to FIGS. 5A-5D, the second end 144 of the first segment 140 may transition (see transition 180 in FIG. 2) to the second end 164 of the third segment 160 at the outer edges 148, 168 of the first and third layers 108, 112. The first end 142 of the first segment 140 may transition to the first end 154 of the second segment 150 at the inner edges 146, 156. The second end 152 of the second segment 150 may transition to the second end 172 of the fourth segment 170 at the outer edges 158, 178 of the second and fourth layers 110, 114.

Thus, each layer 108, 110, 112, 114 of the optical fiber coil 100 may be formed from one substantially planar segment of the optical fiber 102. Furthermore, the optical fiber 102 may transition from planar segment to planar segment only proximate the inner edges 146, 156, 166, 176 and the outer edges 148, 158, 168, 178 of each layer 108, 110, 112, 114. As such, the disclosed optical fiber coil 100 may include significantly fewer micro-bends as compared to optical fiber coils wound using other techniques.

While the layers 108, 110, 112, 114 of the optical fiber coil 100 are shown and described as having a generally circular profile in planar view, planar layers having various non-circular profiles (e.g., oval or rounded rectilinear) may be formed without departing from the scope of the present disclosure.

Furthermore, while FIGS. 4 and 5A-5D illustrate an optical fiber coil 100 that is wound in a substantially symmetrical fashion (i.e., layers 108, 112 are wound counter-clockwise to form a first half cycle of symmetrical winding and layers 110, 114 are wound clockwise to form a second half cycle of symmetrical winding), asymmetrical winding is also contemplated. Without being limited to any particular theory, it is believed that symmetrically winding the optical fiber 102 to form the optical fiber coil 100 may minimize temperature gradients and stresses within the optical fiber coil 100.

Figure 6:
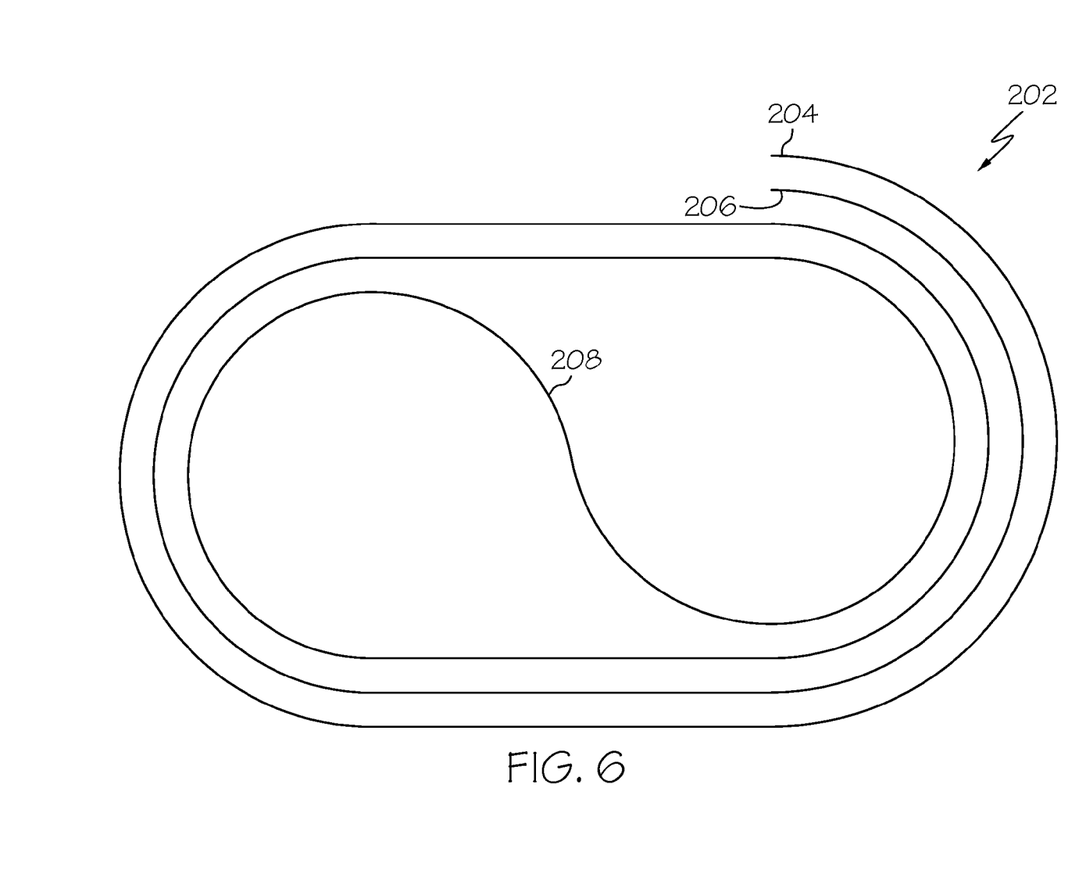
FIG. 6 is a top planar view of an individual layer of a low strain optical fiber coil in accordance with a second embodiment.

Referring to FIG. 6, in one alternative embodiment, an optical fiber coil may be constructed having a plurality of planar layers (only one layer 202 is shown in FIG. 6), wherein each planar layer 202 is formed by winding both ends 204, 206 of the optical fiber 208 at the same time.

At this point, those skilled in the art will appreciate that the layers of the disclosed optical fiber coil may have various shapes and configurations, and may be wound using various winding techniques. However, by winding each layer in a plane and stacking the planar layers to form an optical fiber coil comprised of multiple planar layers, layer-to-layer transitions (micro-bends) may occur at most twice in each layer (i.e., at the inner edge and the outer edge). Therefore, the number of micro-bends in the disclosed optical fiber coil may be reduced to a minimum.

The disclosed optical fiber coil may be incorporated into a rotation sensing device. For example, the disclosed optical fiber coil (e.g., optical fiber coil 100 shown in FIG. 2) may be substituted for coil 20 of the fiber optic gyroscope 10 shown in FIG. 1.

Figure 7:
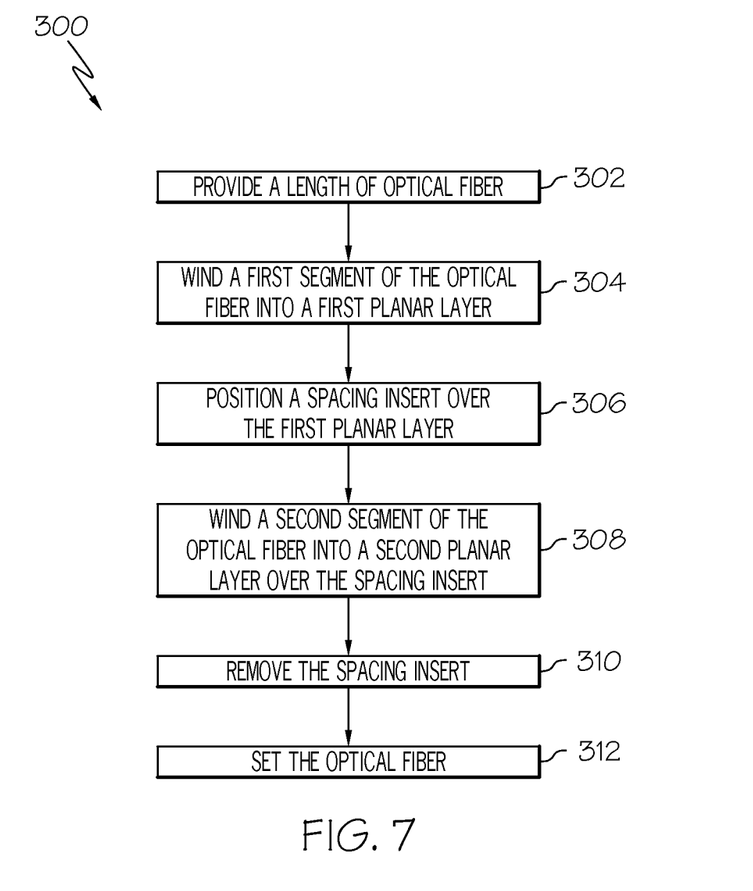
FIG. 7 is a flow chart depicting one method of manufacturing the low strain optical fiber coil of FIG. 2.

Referring to FIG. 7, also disclosed is a method, generally designated 300, for manufacturing a low strain optical fiber coil. The method 300 may begin at Block 302 with the step of providing a length of optical fiber.

At Block 304, a first segment of the optical fiber may be wound into a first planar layer. For example, the first segment of the optical fiber may be wound in a counter-clockwise direction from an inner edge to an outer edge, thereby forming the first planar layer of the optical fiber coil.

At Block 306, a spacing insert may be positioned over the first planar layer. The spacing insert may be a thin sheet of paper or the like, and may function to separate the first planar layer from the second planar layer during formation of the second planar layer.

At Block 308, a second segment of the optical fiber may be wound on the spacing insert to form a second planar layer. For example, the second segment of the optical fiber may be wound in a clockwise direction from an inner edge to an outer edge, thereby forming the second planar layer of the optical fiber coil.

At Block 310, the spacing insert may be removed from between the first and second planar layers. Optionally, the spacing insert may then be positioned over the second planar layer, and the process of forming planar layers may be repeated until the desired number of planar layers has been formed.

At Block 312, the optical fiber may be set to maintain the shape of the optical fiber coil. In one expression, the optical fiber may be set upon the completion of each planar layer (e.g., prior to the step of Block 306). In another expression, the optical fiber may be set after the formation of two or more layers (e.g., all layers) of the optical fiber coil.

As one example, the optical fiber may be set by heating the optical fiber coil to cure a thermoplastic polymer coating (see layer 134 in FIG. 3) on the optical fiber. As another example, a bonding agent may be applied to the optical fiber coil. For example, the bonding agent may be an epoxy, such as an epoxy having thermal expansion properties matched to the thermal expansion properties of the optical fiber.

Accordingly, the disclosed optical fiber coil and method for manufacturing the same may include low loss, uniform coils with minimized micro-bending (e.g., micro-bending may occur at most twice in each layer—at the inner edge and the outer edge). Furthermore, symmetrical winding may mitigate the effects of temperature gradients and stress in the optical fiber coil.

Although various embodiments of the disclosed low strain optical fiber coil and method for manufacturing the same have been shown and described, modifications may occur to those skilled in the art upon reading the specification. The present application includes such modifications and is limited only by the scope of the claims.

What is claimed is:

1. An optical fiber coil comprising:
   an optical fiber having a first end and a second end, the optical fiber comprising a first segment, a second segment, a third segment and a fourth segment, wherein the first segment is contiguous with the second segment, the second segment is contiguous with the third segment, and the third segment is contiguous with the fourth segment; and
   a plurality of substantially planar layers stacked along a coil axis, wherein the plurality of substantially planar layers comprise a first planer layer formed from the first segment, a second planar layer formed from the second segment, a third planar layer formed from the third segment, and a fourth planar layer formed from the fourth segment,
   wherein the fourth planar layer is positioned between the first planar layer and the second planar layer, and
   wherein the second planer layer is positioned between the third planer layer and the fourth planar layer.

2. The optical fiber coil of claim 1 wherein the optical fiber has a length of at least 10 meters.

3. The optical fiber coil of claim 1 wherein the plurality of substantially planar layers have an inner edge and an outer edge.

4. The optical fiber coil of claim 3 wherein the optical fiber transitions from one layer of the plurality of substantially planar layers to another layer of the plurality of substantially planar layers at one of the inner edge and the outer edge.

5. The optical fiber coil of claim 3 wherein the optical fiber does not transition from one layer of the plurality of substantially planar layers to an adjacent layer of the plurality of substantially planar layers except at one of the inner edge and the outer edge.

6. The optical fiber coil of claim 3 wherein one layer of the plurality of substantially planar layers is wound from the inner edge to the outer edge, and wherein another layer of the plurality of substantially planar layers is wound from the outer edge to the inner edge.

7. The optical fiber coil of claim 3 wherein one layer of the plurality of substantially planar layers is wound from the inner edge to the outer edge, and wherein an adjacent layer of the plurality of substantially planar layers is wound from the outer edge to the inner edge.

8. The optical fiber coil of claim 1 wherein one layer of the plurality of substantially planar layers is wound in a first direction about the coil axis, and wherein another layer of the plurality of substantially planar layers is wound in a second direction about the coil axis, the second direction being opposite of the first direction.

9. The optical fiber coil of claim 1 wherein one layer of the plurality of substantially planar layers is wound in a first direction about the coil axis, and wherein an adjacent layer of the plurality of substantially planar layers is wound in a second direction about the coil axis, the second direction being opposite of the first direction.

10. The optical fiber coil of claim 1 wherein each planar layer of the plurality of substantially planar layers is substantially parallel with other planar layers of the plurality of substantially planar layers.

11. The optical fiber coil of claim 1 wherein the optical fiber is wound generally circumferentially about the coil axis.

12. The optical fiber coil of claim 1 wherein each layer of the plurality of substantially planar layers has a substantially annular shape in planar view.

13. An optical device comprising the optical fiber coil of claim 1.

14. A fiber optic gyroscope comprising:
   the optical fiber coil of claim 1;
   a light source configured to provide a first light beam to the first end and a second light beam to the second end; and
   a detector configured to receive the first light beam from the second end and the second light beam from the first end.

15. The fiber optic gyroscope of claim 14 further comprising a processor configured to determine a phase shift between the first light beam exiting the second end and the second light beam exiting the first end.

16. The fiber optic gyroscope of claim 14 further comprising an integrated optical circuit.

* * * * *